No. 809,925. PATENTED JAN. 9, 1906.
S. O. RICHARDSON, Jr.
GLASS FURNACE.
APPLICATION FILED APR. 20, 1905.
3 SHEETS—SHEET 1.
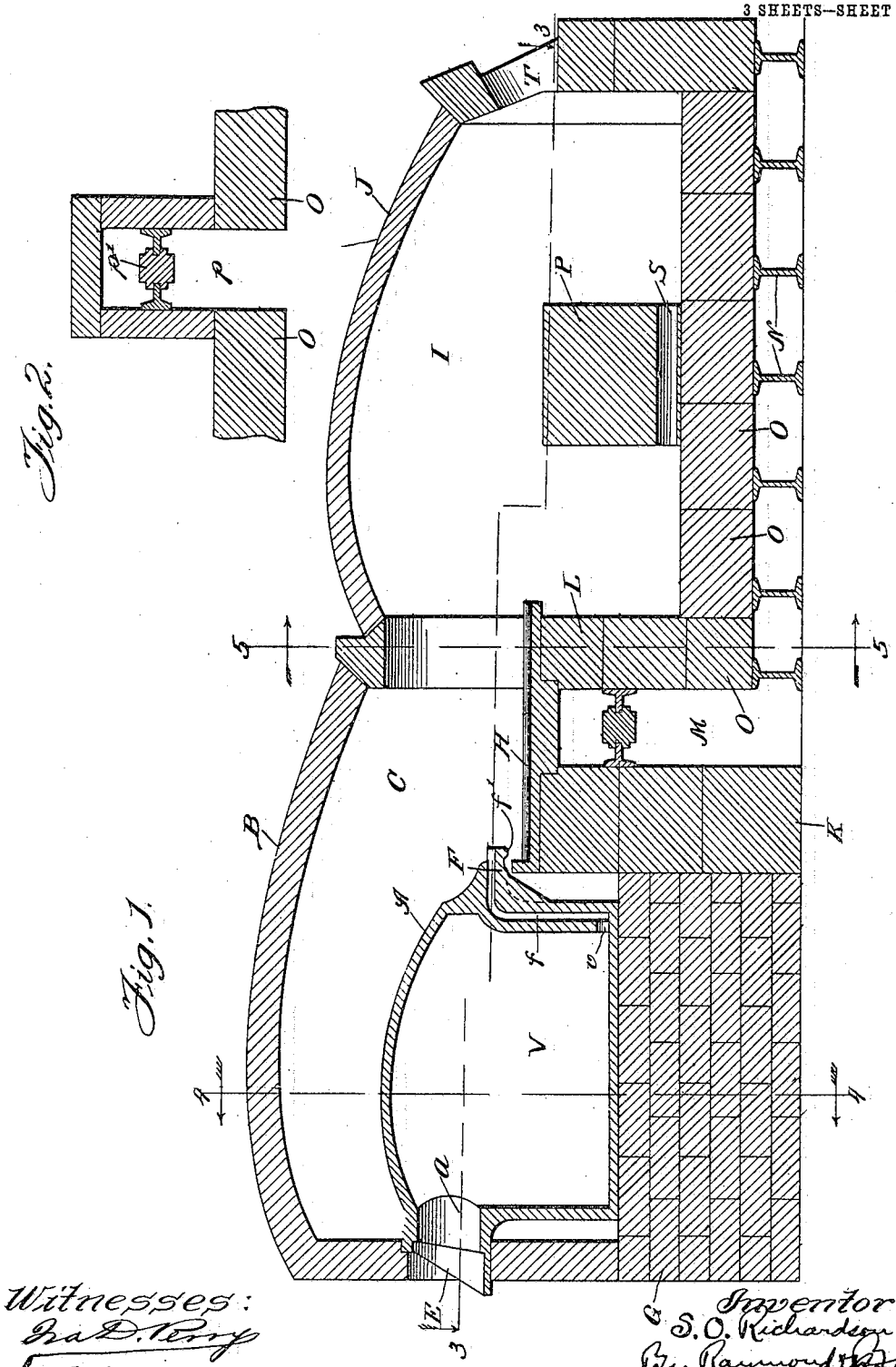

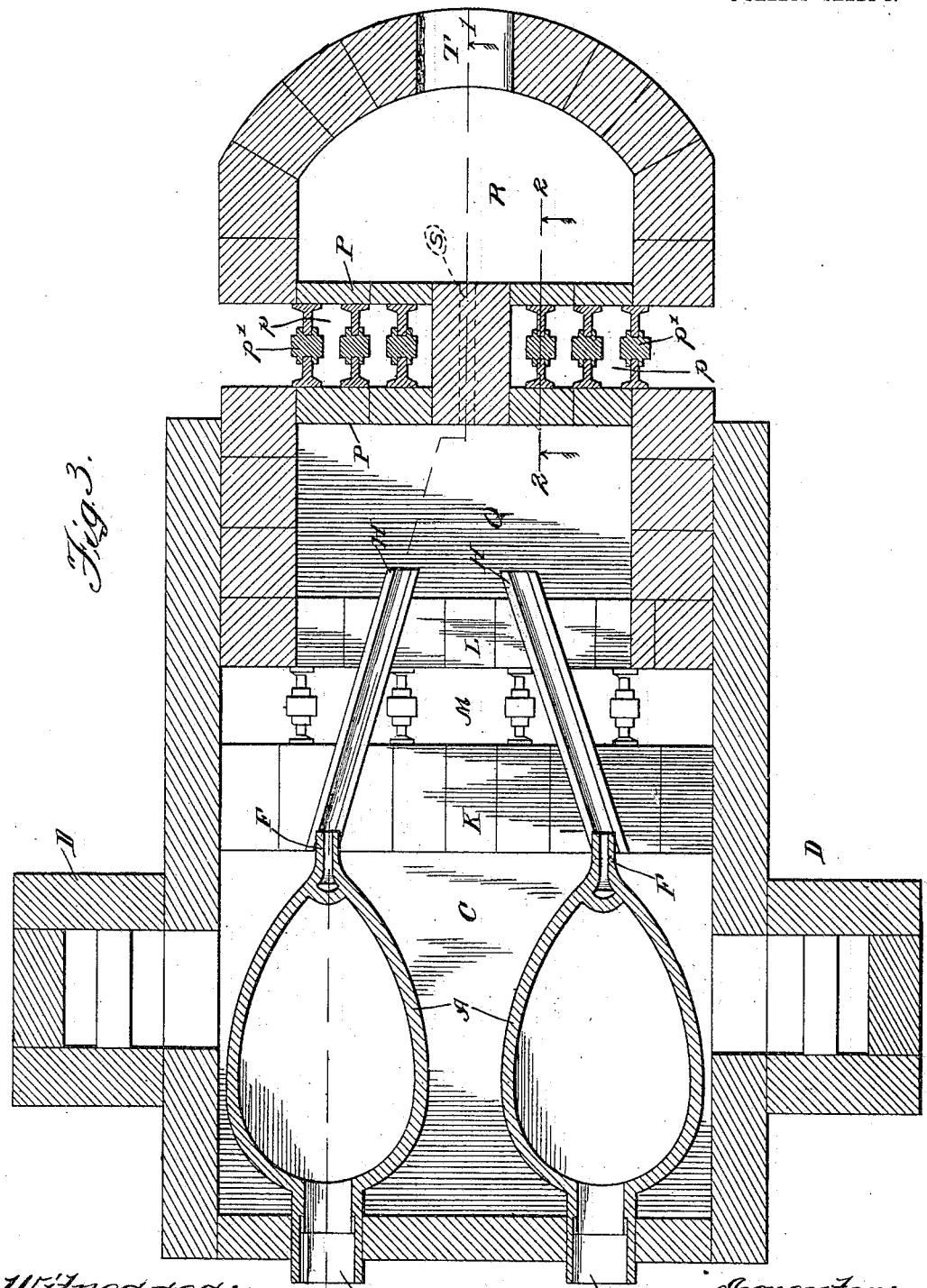

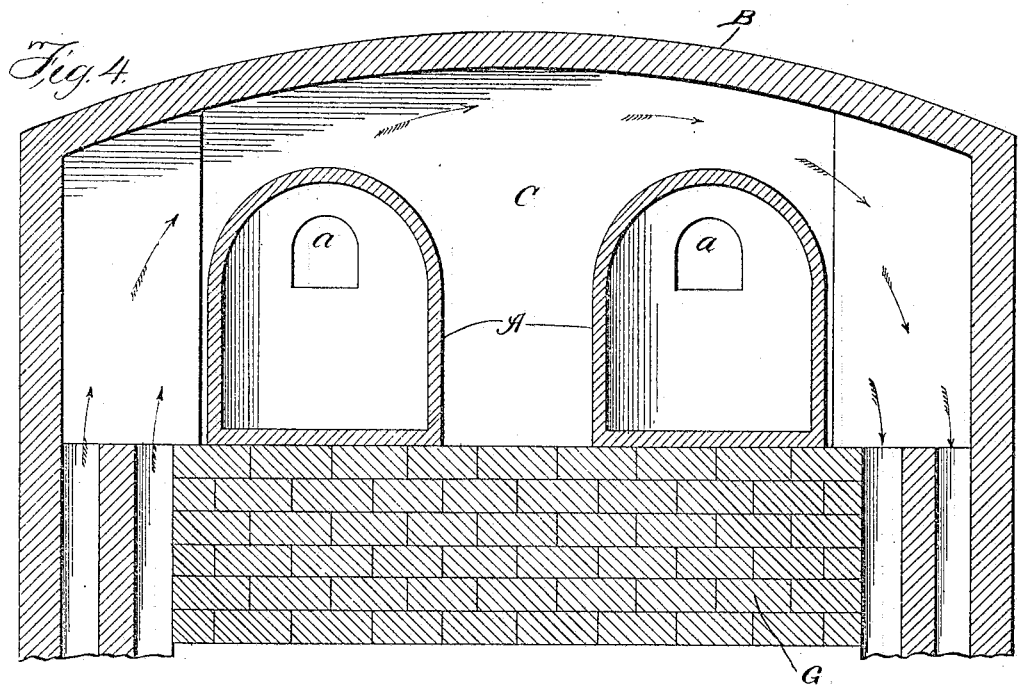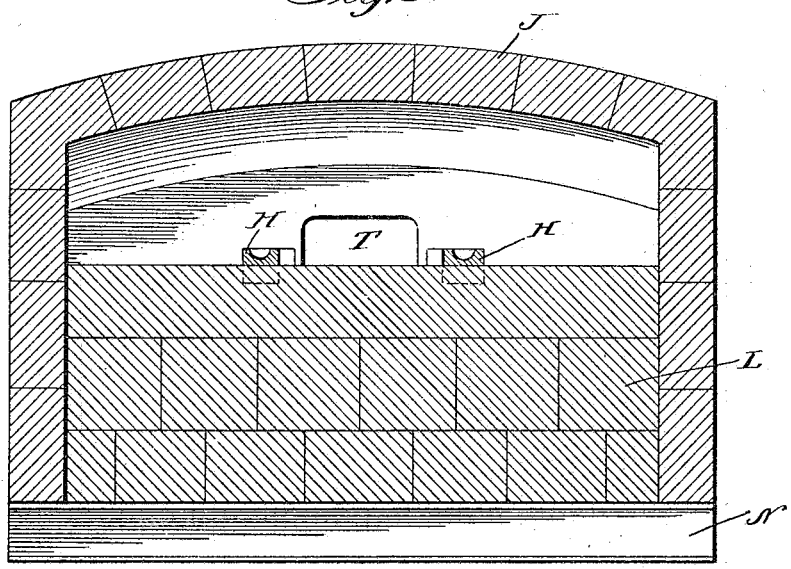

UNITED STATES PATENT OFFICE.

SOLON OSMOND RICHARDSON, JR., OF TOLEDO, OHIO.

GLASS-FURNACE.

No. 809,925.           Specification of Letters Patent.           Patented Jan. 9, 1906.

Original application filed July 2, 1904, Serial No. 215,053. Divided and this application filed April 20, 1905. Serial No. 256,533.

*To all whom it may concern:*

Be it known that I, SOLON OSMOND RICHARDSON, Jr., a citizen of the United States, residing at Toledo, in the county of Lucas and State of Ohio, have invented certain new and useful Improvements in Glass-Furnaces, of which the following is a specification.

My invention relates to improvements in glass-furnaces of the general type shown in my Patent No. 756,409.

The present application is a division of my copending application, Serial No. 215,053.

The object of my present invention is to simplify and improve upon the construction of the type of furnace shown in my said Patent No. 756,409. This and such other objects as may hereinafter appear are attained by the devices shown in the accompanying drawings, in which—

Figure 1 is a longitudinal sectional view of my present improvement applied to a glass-furnace on the line 1 1 of Fig. 3. Fig. 2 is a detail on the line 2 2 of Fig. 3 looking in the direction indicated by the arrows. Fig. 3 is a horizontal sectional view. Fig. 4 is a view on the line 4 4 of Fig. 1 looking in the direction indicated by the arrows, and Fig. 5 is a view on the line 5 5 of Fig. 1 looking in the direction indicated by the arrows.

Like letters of reference indicate the same parts in the several figures of the drawings.

In the drawings my invention is shown as embodied in a furnace comprising two melting-pots A A, which are mounted under the main arch B, which extends over the heating-chamber C, to which heat is supplied in any suitable manner—as, for example, by means of the regenerators D, of familiar form. The pots are provided with feed-openings $a$, which open outside of the heating-chamber C and may be conveniently closed by blocks E. The pots A are also provided with conduits or spouts F, which open out of said pots at the metal-line thereof and discharge within the furnace, and preferably at a distance above the bottom of the pots. The pots A are mounted upon a bench G. The spouts F preferably discharge into troughs or conduits H, which lead into the plaining-chamber I of the furnace beneath the arch J. The heating-chamber C and the plaining-chamber I are separated from each other by walls K L, between which and beneath the troughs H extends an air-pot M.

The furnace as a whole may be supported in the familiar manner upon I-beams N, affording an air-space beneath the bottom of the tank part of the furnace, thereby making the furnace metal-tight in the usual manner, because metal working between the blocks O will be congealed by the atmosphere. The air-port M therefore serves to make of the wall L a metal-tight partition as between the heating-chamber C and the plaining-chamber I. Consequently since the metal - line in the plaining-chamber I is below the top of the troughs H the pots A are not accessible to the metal within the plaining-chamber.

The pots A may be mounted at any desired level so long as there is sufficient fall between the outlet from the pots A and the metal-line in the chamber I to permit the metal to flow from the pots A into the chamber I. This arrangement permits the construction of the arches B and J at somewhere near the same level, so as to afford a free radiation of heat from the heating-chamber C into the plaining-chamber I.

The plaining-chamber I is divided by a wall P into a receiving-chamber Q and a working chamber R, which are connected by a port or passage S through the wall P. Metal is worked out of the working chamber R through the working opening T, which may be closed when not in use in any convenient manner.

The pots A A may be of any suitable form whereby the batch may be fed thereto from outside of the heating-chamber C, may be reduced therein without being subjected to direct contact with the reducing-gases, and may be continuously conducted therefrom. The particular form of pot shown is what I term a "trap-pot," so constructed that while some of the plaining may be done within the pot the pot will serve, primarily, to protect the batch during reduction, and most of the plaining will occur within that part of the furnace into which the glass flows when it leaves the pot. In this form of pot substantially the entire interior of the pot is occupied by the reducing-chamber V, which communicates with the spout F through a trap formed by a conduit $f$, which communicates with the lower part of the reducing-chamber at its base through a port $v$ and rises through the vertical wall of the pot until it communicates with the spout F. This spout F preferably projects straight outwardly, as shown, and is provided with a downwardly-projecting lip $f'$, so that the fluid glass will drop directly from the end of the spout F, and thus have no tendency to flow backwardly along the under side of the spout F. With this form of pot I avoid difficulties which are inherent in the manufacture and use of pots provided with a distinct partition, where the unequal expansion and contraction, as between the outer walls of the pot and the partition, in the drying, seasoning, heating, and use of the pot have a tendency to produce cracks. In this trap-pot the vertical conduit may be provided within the thickness of the outer wall of the pot, so that this differential expansion and contraction is so practically eliminated as to cause no trouble.

It will be understood that in the drawings I have shown my present invention in what I now consider to be its improved form; but many departures in detail may be made from such embodiment without departing from the spirit of my invention, which rests mainly in the arrangement of the respective parts whereby the heating-chamber is separated from the plaining-chamber by a metal-tight partition, in the mounting of the pot at a lower level, whereby a freer radiation from the heating-chamber to the plaining-chamber is obtained, and in the structure of the pot itself, as well as in the details of the structures as a whole, which are shown in the drawings, as above described.

The wall P need only extend above the metal-line in the plaining-chamber I, and in the construction shown in the drawings, while it is solid along the central section thereof, (shown in Fig. 1,) it is hollow at each side of that central section, the hollow space within the wall opening downwardly and forming an air-port $p$, across which extend braces $p'$, as shown in Fig. 2.

It will be noted that in the preferred structure the passage S through the wall P extends through the body of the block, which forms the solid central section of said wall.

I claim—

1. A glass-furnace which comprises a heating-chamber and a plaining-chamber, in free communication with each other above the metal-line of the plaining-chamber, a melting-pot mounted in the heating-chamber, a metal-conduit leading from the outlet of the melting-pot into the plaining-chamber, said furnace being provided with an air-port interposed between the heating-chamber and the plaining-chamber, below said conduit.

2. A glass-furnace, comprising a heating-chamber, a substantially closed melting-pot mounted in said heating-chamber, said pot being provided with a feed-port opening outside of said heating-chamber, and with an outlet-port discharging into the furnace, said furnace being also provided with a plaining-chamber, a conduit arranged to receive metal from said pot and to take it into said plaining-chamber, said furnace being also provided with an air-port interposed between the plaining-chamber and the heating-chamber, and below the level at which said conduit crosses said air-port.

3. In a glass-furnace, the combination with a heating-chamber, of a melting-pot mounted in said chamber and having a feed-in opening at one end and arranged to discharge into said heating-chamber, a plaining-chamber, means for conducting the product of said pot from the heating-chamber to the plaining-chamber, and means for passing the flame and gases through said heating-chamber and around said pot, so as to reduce the contents of said pot and maintain the fluidity of the contents of said plaining-chamber.

SOLON OSMOND RICHARDSON, JR.

Witnesses:
WM. R. BROWNLEE,
CHAS. G. ROBB.